United States Patent
Inai et al.

(10) Patent No.: US 7,871,731 B2
(45) Date of Patent: Jan. 18, 2011

(54) FUEL CELL ASSEMBLY OPERATING METHOD AND FUEL CELL SYSTEM

(75) Inventors: Shigeru Inai, Wako (JP); Katsumi Hayashi, Wako (JP); Hiromichi Yoshida, Wako (JP); Ryo Jinba, Wako (JP); Minoru Koshinuma, Wako (JP); Naoki Mitsuta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 765 days.

(21) Appl. No.: 11/248,449

(22) Filed: Oct. 12, 2005

(65) Prior Publication Data

US 2006/0083968 A1    Apr. 20, 2006

(30) Foreign Application Priority Data

Oct. 14, 2004    (JP) .............................. 2004-300303

(51) Int. Cl.
 *H01M 8/04*    (2006.01)
 *H01M 8/10*    (2006.01)
(52) U.S. Cl. .................. 429/429; 429/433; 429/428; 429/443; 429/479
(58) Field of Classification Search .................. None
See application file for complete search history.

(56) References Cited

U.S. PATENT DOCUMENTS

2005/0053807 A1*    3/2005    Breault et al. .................. 429/13
2006/0134483 A1*    6/2006    Gallagher .................... 429/26

FOREIGN PATENT DOCUMENTS

JP    2002-093445    *    3/2002
JP    2003-151601    *    5/2003

OTHER PUBLICATIONS

Japanese Office Action for Application No. 2004-300303, dated Apr. 20, 2010.

* cited by examiner

*Primary Examiner*—Dah-Wei Yuan
*Assistant Examiner*—Angela J. Martin
(74) *Attorney, Agent, or Firm*—Nelson Mullins Riley & Scarborough LLP; Anthony A. Laurentano

(57) ABSTRACT

A method of operating a fuel cell assembly and a fuel cell system use a simple construction to restrain deterioration of power generating performance of a fuel cell assembly at a startup in a subfreezing environment. If an ignition switch is turned off is STEP 1, a control unit determines in STEP 3 whether the temperature of a fuel cell assembly (the internal temperature of the fuel cell assembly) is lower than a predetermined temperature, which is higher than the temperature at which the water produced during power generation freezes. If the internal temperature of the fuel cell assembly is the predetermined temperature or higher, then the processing proceeds to STEP 4 wherein a power generating condition is adjusted to cause the internal temperature of the fuel cell assembly to rise. In STEP 5, an alarm device is actuated. The power generation is continued until the internal temperature of the fuel cell assembly reaches the predetermined temperature or higher, and then the power generation is stopped in STEP 8.

8 Claims, 3 Drawing Sheets

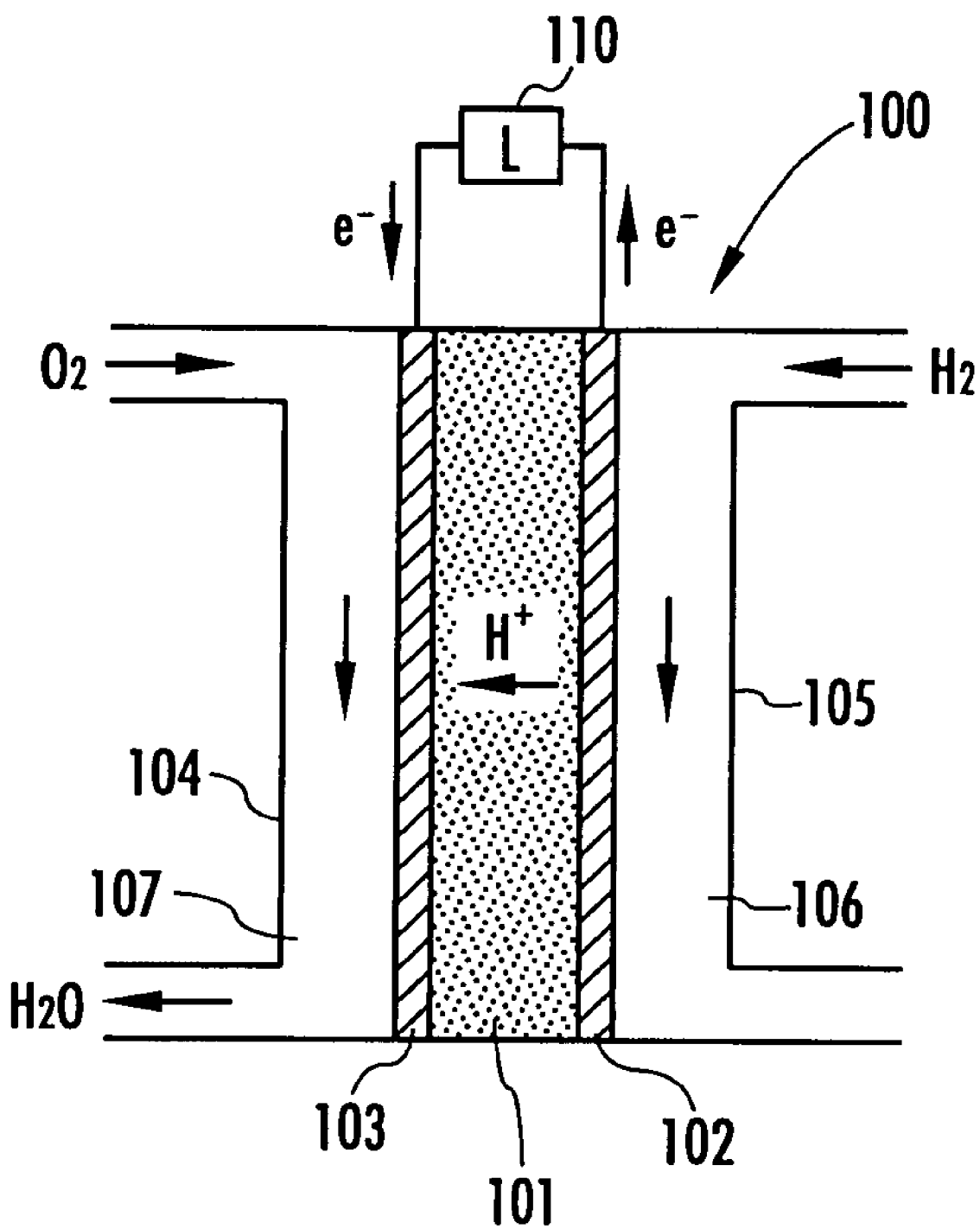

FUEL CELL ASSEMBLY OPERATING METHOD AND FUEL CELL SYSTEM

BACKGROUND OF THE INVENTION

1. Field of the Invention

The present invention relates to a fuel cell assembly operating method and a fuel cell system adapted for power generation in a subfreezing environment.

2. Description of the Related Art

Referring to FIG. 3, a solid polymer type fuel cell assembly 100 has a solid polymer electrolyte membrane 101, a hydrogen electrode 102 and an oxygen electrode 103 that have catalytic action, which are provided on both sides of the membrane 101, and separators 104 and 105 that constitute supply passages of hydrogen and oxygen (contained in air), which are reactive gases, between the electrodes 102 and 103.

A hydrogen gas $H_2$ supplied to a supply passage 106 formed by the separator 104 emits electrons $e^-$ at the hydrogen electrode 102, turning into hydrogen ions $H^+$. The hydrogen ions $H^+$ conduct in the solid polymer electrolyte membrane 101. Meanwhile, in the oxygen electrode 103, the reaction represented by expression (1) given below takes place from an oxygen gas $O_2$ in the air supplied to a supply passage 107 formed by the separator 105 and an electron $e^-$ and a hydrogen ion $H^+$ supplied from the oxygen electrode 103, thereby generating water ($H_2O$).

$$\tfrac{1}{2}O_2 + 2H^+ + 2e^- \rightarrow H_2O \tag{1}$$

When starting up the fuel cell assembly 100 in a subfreezing environment, if water generated according to the above expression (1) during previous power generation still remains in the fuel cell assembly 100, the remaining water freezes on the oxygen electrode 103, inconveniently leading to deteriorated conductivity of the hydrogen ions $H^+$ in the polymer electrolyte membrane 101. This results in deteriorated power generating performance of the fuel cell assembly 100.

As a method for thawing ice in a fuel cell assembly by increasing the temperature of a fuel cell stack when starting up a fuel cell assembly in a subfreezing environment to solve the aforesaid problem, there has been proposed, for example, a method for heating the air supplied to a fuel cell stack by a heater to raise the temperature of the fuel cell stack (refer to, e.g., Japanese Unexamined Patent Application Publication No. 2002-93445).

However, providing the heater for heating air, as mentioned above, inconveniently complicates the construction of a fuel cell system and also increases the number of components.

SUMMARY OF THE INVENTION

Accordingly, it is an object of the present invention to provide a method of operating a fuel cell assembly and a fuel cell system that use a simple construction to solve the problems described above and restrain deterioration of the power generating performance of a fuel cell assembly when starting up the fuel cell assembly in a subfreezing environment.

To this end, according to one aspect of the present invention, there is provided a method of operating a fuel cell assembly constructed by connecting a plurality of solid polymer type fuel cells, including a first step for determining whether the temperature of the fuel cell assembly is lower than a predetermined temperature, when a stop condition has been satisfied while the fuel cell assembly is performing a power generating operation, and a second step for continuing the power generating operation of the fuel cell assembly until the temperature of the fuel cell assembly reaches the predetermined temperature or higher if the temperature of the fuel cell assembly is lower than the predetermined temperature, and then stopping the power generating operation of the fuel cell assembly.

With this arrangement, when the stop condition of the fuel cell assembly is satisfied while the fuel cell assembly is performing the power generating operation, it is determined in the first step whether the temperature of the fuel cell assembly is lower than the predetermined temperature. If the power generation of the fuel cell assembly is immediately stopped when it has been determined that the temperature of the fuel cell assembly is lower than the predetermined temperature, then the water generated during the power generation freezes in fuel cells. For this reason, if the temperature of the fuel cell assembly is lower than the predetermined temperature, the power generating operation of the fuel cell assembly is continued until the temperature of the fuel cell assembly reaches the predetermined temperature or higher, and then the power generation of the fuel cell assembly is stopped, with the second step. In this case, the water generated during the power generation of the fuel cell assembly is in the form of a gas or a liquid, so that most generated water is drained out of the fuel cells, with only a very small amount of the generated water remaining in the fuel cells. Thus, when restarting the fuel cell assembly in a subfreezing environment thereafter, the deterioration of the power generating performance of the fuel cell assembly caused by the freezing of the generated water remaining in the fuel cells can be restrained.

Preferably, an alarm is given by an alarm device while the power generating operation of the fuel cell assembly is being continued in the second step.

This arrangement makes it possible to prevent a user from feeling nervous or insecure when the fuel cell assembly does not stop despite the stop condition having been satisfied and the power generating operation of the fuel cell assembly is continued in the second step.

Preferably, scavenging is performed by supplying a reactive gas to the fuel cell assembly after the power generation of the fuel cell assembly is stopped in the second step.

With this arrangement, the scavenging carried out after the power generation of the fuel cell assembly is stopped further reduces the volume of the generated water remaining in the fuel cells to be extremely small, making it possible to restrain the deterioration of the power generating performance of the fuel cell assembly for the next power generating operation.

According to another aspect of the present invention, there is provided a fuel cell system having a fuel cell assembly constructed by connecting a plurality of solid polymer type fuel cell assembly cells, a power generation controlling means for controlling the operation of the fuel cell assembly, and a fuel cell assembly temperature grasping means for grasping the temperature of the fuel cell assembly, wherein the power generation controlling means determines whether the temperature of the fuel cell assembly is lower than a predetermined temperature when a stop condition has been satisfied while the fuel cell assembly is generating power, continues the power generating operation of the fuel cell assembly until the temperature of the fuel cell assembly reaches the predetermined temperature or higher if the temperature of the fuel cell assembly is lower than the predetermined temperature, and then stops the power generation of the fuel cell assembly.

With this arrangement, when the stop condition is satisfied while the fuel cell assembly is generating power, if the temperature of the fuel cell assembly grasped by the fuel cell assembly temperature grasping means is lower than the predetermined temperature, then the power generating operation is continued by the power generation controlling means until the temperature of the fuel cell assembly reaches the predetermined temperature or higher, and then the power generating operation of the fuel cell assembly is stopped. Thus, most of the water generated during the power generation is in the form of a gas or a liquid and drained out of the fuel cells, with only a very small amount of the generated water remaining in the fuel cells. Hence, when restarting the fuel cell assembly in a subfreezing environment thereafter, the deterioration of the power generating performance of the fuel cell assembly caused by the freezing of the generated water remaining in the fuel cells can be restrained.

Preferably, the fuel cell system is provided with an alarm device for giving an alarm while the power generating operation of the fuel cell assembly is being continued by the power generation controlling means until the temperature detected by the temperature detector reaches the predetermined temperature or higher.

This arrangement makes it possible to prevent a user from feeling nervous or insecure when the fuel cell assembly does not stop despite the stop condition having been satisfied and the power generating operation of the fuel cell assembly is continued by the power generation controlling means.

Preferably, the power generation controlling means performs scavenging by supplying a reactive gas to the fuel cell assembly after the power generation of the fuel cell assembly is stopped.

With this arrangement, the scavenging carried out after the power generation of the fuel cell assembly is stopped further reduces the volume of the generated water remaining in the fuel cells to be extremely small, making it possible to restrain the deterioration of the power generating performance of the fuel cell assembly for the next power generating operation.

Preferably, the fuel cell system is provided with a circulation passage provided in the fuel cell assembly, a pump that circulates a refrigerant in the circulation passage to cool the fuel cell assembly, a refrigerant inlet temperature sensor for detecting the temperature of a refrigerant in the circulation passage at near the inlet to the fuel cell assembly, and a refrigerant outlet temperature sensor for detecting the temperature of the refrigerant in the circulation passage at near the outlet from the fuel cell assembly, wherein the fuel cell assembly temperature grasping means grasps the temperature of the fuel cell assembly from the difference between a temperature detected by the refrigerant inlet temperature sensor and a temperature detected by the refrigerant outlet temperature sensor.

With this arrangement, an increase in the temperature of the fuel cell assembly results in a higher temperature rise of a refrigerant passing through the fuel cell assembly of the circulation circuit, leading to a larger difference between the temperature detected by the refrigerant inlet temperature sensor and the temperature detected by the refrigerant outlet temperature sensor. This allows the fuel cell assembly temperature grasping means to grasp the temperature of the fuel cell assembly from the difference between the temperature detected by the refrigerant inlet temperature sensor and the temperature detected by the refrigerant outlet temperature sensor.

Preferably, in the method of operating a fuel cell assembly and the fuel cell system, the predetermined temperature is set to a value that exceeds the freezing temperature of water produced during power generation. This increases the effect of preventing water remaining inside the fuel cell from freezing.

BRIEF DESCRIPTION OF THE DRAWINGS

FIG. 3 is a diagram showing the internal construction of the fuel cell assembly.

DESCRIPTION OF THE PREFERRED EMBODIMENTS

Figure 1:
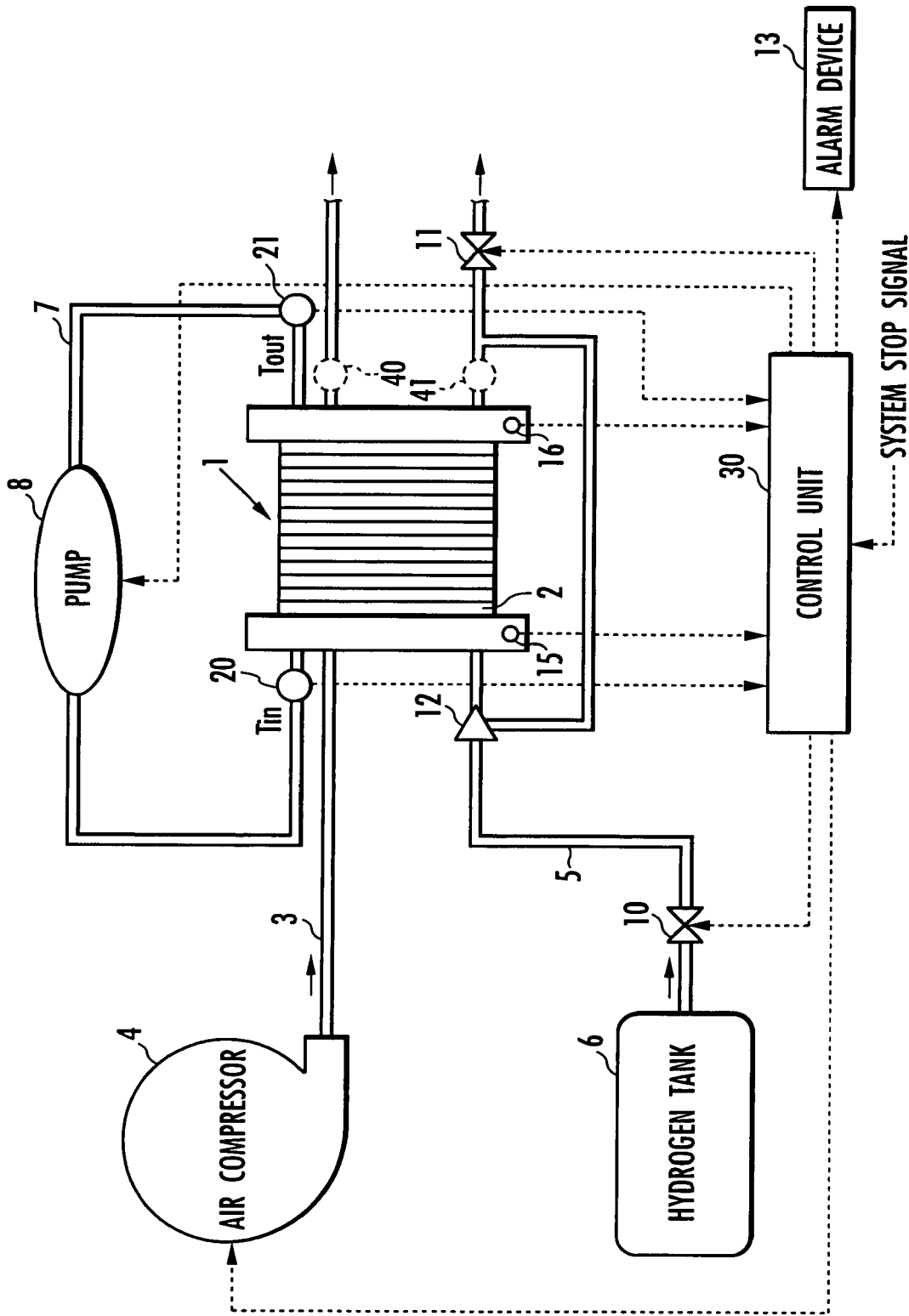
FIG. 1 is a general block diagram of a fuel cell system.
Figure 2:
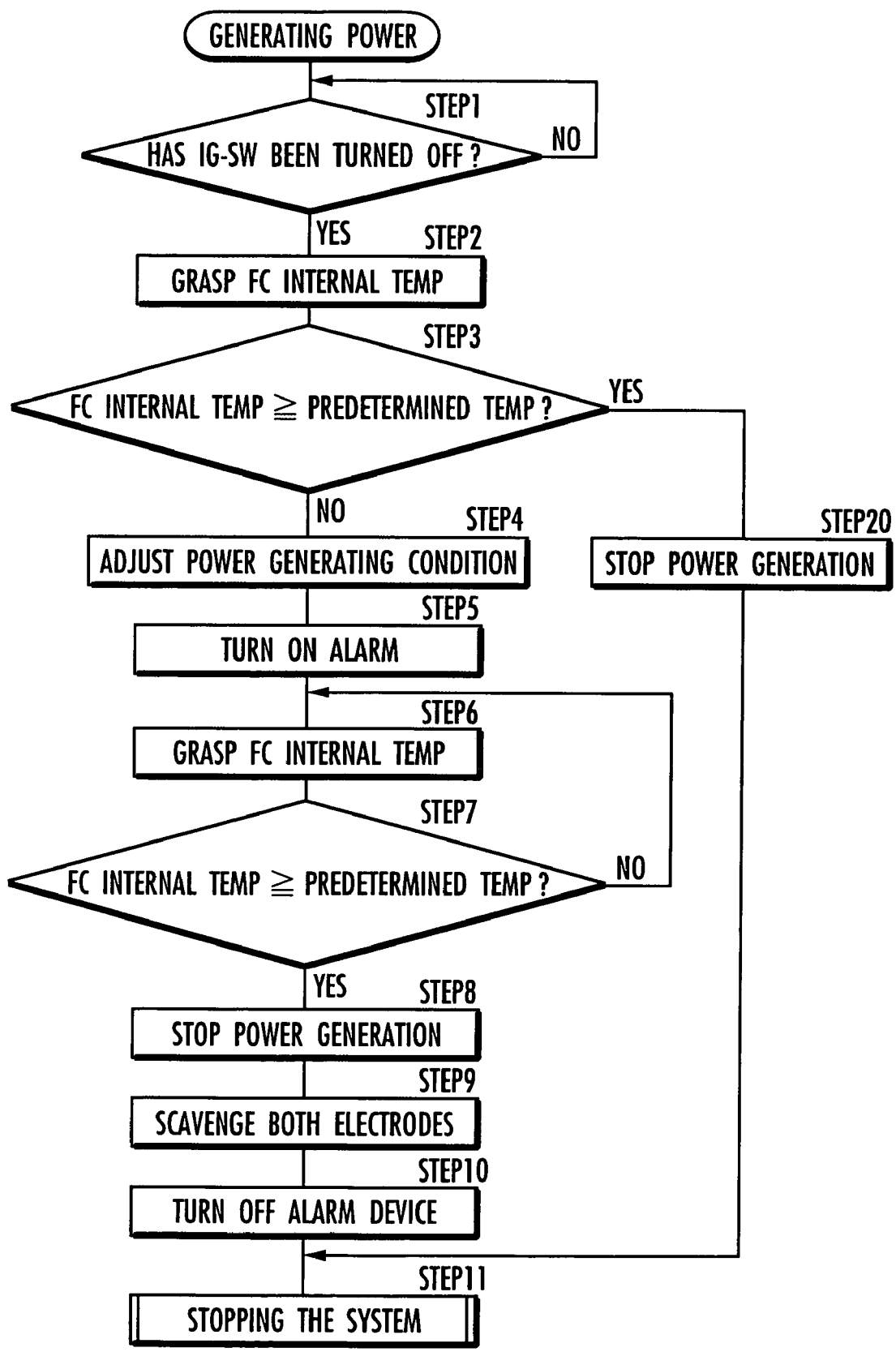
FIG. 2 is a control flowchart of the procedure for stopping a power generating operation of a fuel cell assembly.

With reference to FIGS. 1 and 2, an embodiment of the present invention will be explained. FIG. 1 is a general block diagram of a fuel cell system, and FIG. 2 is a control flowchart of the procedure for stopping power generation of a fuel cell assembly.

Referring to FIG. 1, a fuel cell system according to the present embodiment is adapted to be mounted in a fuel cell car, and includes a fuel cell assembly (fuel cell stack) 1 constructed by connecting a plurality of fuel cells 2, an air compressor 4 for supplying air to the fuel cell assembly 1 through an air supply pipe 3, a hydrogen tank 6 for supplying hydrogen to the fuel cell assembly 1 through a hydrogen supply pipe 5, a pump 8 for cooling the fuel cell assembly 1 by circulating a refrigerant in a circulation passage 7, a hydrogen valve 10 for adjusting the supply amount of hydrogen, an exhaust valve 11 for adjusting the amount of exhaust from the hydrogen supply pipe 5, an ejector 12 for collecting hydrogen contained in the exhaust from the hydrogen supply pipe 5 and adding the collected hydrogen back into the hydrogen supply pipe 5 on the upstream side of the fuel cell assembly 1, various sensors 15 and 16 for detecting output voltages or the like of the fuel cells 2, a refrigerant inlet temperature sensor 20 for detecting the temperature of a refrigerant in the circulation passage 7 at near the inlet to the fuel cell assembly 1, a refrigerant outlet temperature sensor 21 for detecting the temperature of the refrigerant in the circulation passage 7 at near the outlet from the fuel cell assembly 1, an alarm 13, and a control unit 30 (including the function of the power generation controlling means in the present invention) for controlling the entire operation of the fuel cell system.

The detection signals of the various sensors 15 and 16, the refrigerant inlet temperature sensor 20, and the refrigerant outlet temperature sensor 21 are supplied to the control unit 30. The operations of the air compressor 4, the pump 8, the hydrogen valve 10, the exhaust valve 11, and the alarm 13 are controlled by control signals issued from the control unit 30.

Referring now to the flowchart shown in FIG. 2, the procedure of controlling the fuel cell assembly 1 by the control unit 30 when stopping the power generation of the fuel cell assembly 1 will be explained.

If an ignition (IG) switch is turned off by a driver of a vehicle while the fuel cell assembly 1 is generating power (corresponding to the stop condition in the present invention), then the control unit 30 proceeds from STEP 1 to STEP 2 to grasp the temperature of the fuel cell assembly 1 (hereinafter referred to as "the FC internal temperature") from the difference between a detected temperature $T_{in}$ of the refrigerant inlet temperature sensor 20 and a detected temperature $T_{out}$ of the refrigerant outlet temperature sensor 21.

The construction which includes the refrigerant inlet temperature sensor 20 and the refrigerant outlet temperature sensor 21 and in which the control unit 30 grasps the FC internal temperature from the difference between the detected temperature $T_{in}$ of the refrigerant inlet temperature sensor 20 and the detected temperature $T_{out}$ of the refrigerant outlet temperature sensor 21 corresponds to the fuel cell temperature grasping means in the present invention.

In the subsequent STEP 3, the control unit 30 determines whether the FC internal temperature is a predetermined temperature or higher, the predetermined temperature having been set to be higher than a temperature at which water produced during the power generation of the fuel cell assembly 1 freezes.

If the FC internal temperature is found to be the predetermined temperature or higher in STEP 3, then the majority of the produced water is exhausted from the fuel cells 2, because the water produced during the power generation is in the form of a gas or liquid, thus leaving an extremely small volume of the produced water in the fuel cells 2. In this case, therefore, even if the internal temperature of the fuel cell assembly 1 lowers below zero after the power generation of the fuel cell assembly 1 is stopped, the amount of the produced water that freezes in the fuel cells 2 will be extremely small, thus minimizing deterioration of the power generating performance of the fuel cell assembly 1 at a restart.

The control unit 30 branches from STEP 3 to STEP 20 wherein it immediately stops the power generating operation of the fuel cell assembly 1 and proceeds to STEP 11 to carry out the processing for stopping the system. The processing for stopping the system stops the operations of various electronic components, including the control unit 30 itself.

Meanwhile, if the FC internal temperature is found to be lower than the predetermined temperature in STEP 3, then the control unit 30 proceeds to STEP 4. When the power generation of the fuel cell assembly 1 is continued for a certain time, the FC internal temperature reaches the predetermined temperature or higher due to the heat generated by the power generation. This means that the FC internal temperature is found to be lower than the predetermined temperature in STEP 3 in such a case where the IG switch is turned off immediately after a user turns the IG switch on to start the power generating operation of the fuel cell assembly 1 in a subfreezing environment.

If the power generating operation of the fuel cell assembly 1 is performed while the FC internal temperature is lower than the predetermined temperature, the water produced from the power generating operation will not be exhausted from the fuel cells 2, but will immediately freeze on oxygen electrodes in the fuel cells 2. As a result, the conductivity of the hydrogen ions in the polymer electrolyte membranes of the fuel cells 2 deteriorates. Hence, the power generating performance of the fuel cell assembly 1 deteriorates if the fuel cell assembly 1 is restarted with the produced water frozen in the fuel cells 2, as described above.

To avoid such a problem, the control unit 30 adjusts the condition for the power generation of the fuel cell assembly 1 in STEP 4 so as to raise the FC internal temperature, and turns the alarm 13 on (starts the operation) in STEP 5. In the loop of the subsequent STEP 6 and STEP 7, the control unit 30 grasps the FC internal temperature in STEP 6 in the same manner as that in STEP 2 described above to determine in STEP 7 whether the FC internal temperature has reached the predetermined temperature or more. As the alarm 13, an LED display or buzzer mounted on an instrument panel of a fuel cell car is used.

If the FC internal temperature is found to be the predetermined temperature or higher in STEP 7, then the control unit 30 proceeds to STEP 8 wherein it stops the power generating operation of the fuel cell assembly 1. At this time, the produced water remaining in each fuel cell 2 is in the form of a gas or liquid, so that the drainage of the produced water remaining in the fuel cells 2 can be promoted by scavenging implemented by supplying a reactive gas to both electrodes (the hydrogen electrodes and the oxygen electrodes) in the subsequent STEP 9 (the processing for scavenging).

Thus, when the fuel cell assembly 1 is started up thereafter, the power generating performance of the fuel cell assembly 1 can be restrained from deterioration caused by freezing of the produced water remaining in the fuel cells 2 when the internal temperature of the fuel cell assembly 1 lowers down below zero. In the following STEP 10, the control unit 30 turns the alarm 13 off and performs the processing for stopping the system in STEP 11.

The processing for grasping the FC internal temperature in STEP 2 and determining whether the FC internal temperature is lower than the predetermined temperature in STEP 3 corresponds to the first step in the present invention. The processing for continuing the power generating operation of the fuel cell assembly 1 until the FC internal temperature reaches the predetermined temperature or more in STEP 4 to STEP 8 if the FC internal temperature is found to be lower than the predetermined temperature in STEP 3 corresponds to the second step in the present invention.

The present embodiment has shown the fuel cell system mounted in a car. The present invention is, however, applicable to any other system as long as it uses fuel cells in a subfreezing environment.

Further, in the present embodiment, the control unit 30 has grasped the internal temperature of the fuel cell assembly 1 (the FC internal temperature) from the difference between the detected temperature $T_{in}$ of the refrigerant inlet temperature sensor 20 and a detected temperature $T_{out}$ of the refrigerant outlet temperature sensor 21. Alternatively, however, the internal temperature of the fuel cell assembly 1 may be grasped from detected temperatures of a temperature sensor 40 provided in an air supply pipe 3 at near the outlet from the fuel cell assembly 1 or a temperature sensor 41 provided in a hydrogen supply pipe 5 at near the outlet from the fuel cell assembly 1, as shown in FIG. 1. Further alternatively, temperature sensors may be provided in the fuel cells 2 to directly detect the internal temperature of the fuel cell assembly 1.

In the present embodiment, after stopping the power generation in STEP 20 shown in FIG. 2, the control unit has proceeded to STEP 11 to immediately carry out the processing for stopping the system. Alternatively, however, after stopping the power generation in STEP 20, both electrodes may be scavenged before the processing for stopping the system is carried out. Scavenging both electrodes further reduces the produced water remaining in the fuel cells 2 to an extremely small amount, making it possible to minimize deterioration of the power generating performance of the fuel cell assembly 1.

What is claimed is:

1. A method of operating a fuel cell assembly constructed by connecting a plurality of solid polymer fuel cells, comprising:
    a first step in stopping the fuel cell assembly for determining whether the temperature of the fuel cell assembly is lower than a predetermined temperature, when a stop condition has been satisfied while the fuel cell assembly is performing a power generating operation;
    a second step in stopping the fuel cell assembly for continuing the power generating operation of the fuel cell assembly after the stop condition has been satisfied until the temperature of the fuel cell assembly reaches or exceeds the predetermined temperature if the temperature of the fuel cell assembly is lower than the predetermined temperature; and stopping the power generating operation of the fuel cell assembly when the temperature of the fuel cell assembly reaches or exceeds the predetermined temperature, wherein scavenging is performed by supplying a reactive gas to the fuel cell assembly after the power generation of the fuel cell assembly is stopped in the second step.

2. The method of operating a fuel cell assembly according to claim 1, wherein an alarm is given by alarming means while the fuel cell assembly is continuing its power generating operation in the second step.

3. The method of operating a fuel cell assembly according to claim 1, wherein said predetermined temperature is set to a value that exceeds the freezing temperature of water produced during power generation.

4. A fuel cell system comprising:

a fuel cell assembly constructed by connecting a plurality of solid polymer type fuel cell assembly cells;

power generation controlling means for controlling the operation of the fuel cell assembly; and fuel cell assembly temperature grasping means for grasping the temperature of the fuel cell assembly, wherein the power generation controlling means determines, at a time for stopping the fuel cell assembly, whether the temperature of the fuel cell assembly is lower than a predetermined temperature when a stop condition has been satisfied while the fuel cell assembly is performing power generating operation, and continues the power generating operation of the fuel cell assembly after the stop condition has been satisfied until the temperature of the fuel cell assembly reaches or exceeds the predetermined temperature if the temperature of the fuel cell assembly is lower than the predetermined temperature, and then stops the power generation of the fuel cell assembly when the temperature of the fuel cell assembly reaches or exceeds the predetermined temperature, and wherein the power generation controlling means performs scavenging by supplying a reactive gas to the fuel cell assembly after the power generation of the fuel cell assembly is stopped.

5. The fuel cell system according to claim 4, comprising alarming means for giving an alarm while a power generating operation of the fuel cell assembly is being continued by the power generation controlling means until the internal temperature of the fuel cell assembly reaches the predetermined temperature or higher.

6. The fuel cell system according to claim 4, comprising:

a circulation passage provided in the fuel cell assembly;

a pump that circulates a refrigerant in the circulation passage to cool the fuel cell assembly;

a refrigerant inlet temperature sensor for detecting the temperature of a refrigerant in the circulation passage at near an inlet to the fuel cell assembly; and a refrigerant outlet temperature sensor for detecting the temperature of the refrigerant in the circulation passage at near an outlet from the fuel cell assembly, wherein the fuel cell assembly temperature grasping means grasps the temperature of the fuel cell assembly from the difference between a temperature detected by the refrigerant inlet temperature sensor and a temperature detected by the refrigerant outlet temperature sensor.

7. The fuel cell system according to claim 5, comprising:

a circulation passage provided in the fuel cell assembly;

a pump that circulates a refrigerant in the circulation passage to cool the fuel cell assembly;

a refrigerant inlet temperature sensor for detecting the temperature of a refrigerant in the circulation passage at near an inlet to the fuel cell assembly; and a refrigerant outlet temperature sensor for detecting the temperature of the refrigerant in the circulation passage at near an outlet from the fuel cell assembly, wherein the fuel cell assembly temperature grasping means grasps the temperature of the fuel cell assembly from the difference between a temperature detected by the refrigerant inlet temperature sensor and a temperature detected by the refrigerant outlet temperature sensor.

8. The fuel cell system according to claim 4, wherein said predetermined temperature is set to a value that exceeds the freezing temperature of water produced during power generation.

* * * * *